United States Patent [19]
Gouhara et al.

[11] Patent Number: 6,084,633
[45] Date of Patent: Jul. 4, 2000

[54] DIGITAL ELECTRONIC STILL-VIDEO CAMERA, AND METHOD OF CONTROLLING SAME

[75] Inventors: Kouichi Gouhara; Kaoru Adachi; Kenji Moronaga, all of Tokyo, Japan

[73] Assignee: Fuji Photo Film Co., Ltd., Kanagawa, Japan

[21] Appl. No.: 07/991,206

[22] Filed: Dec. 15, 1992

[30] Foreign Application Priority Data

Dec. 16, 1991 [JP] Japan ..................................... 3-351794

[51] Int. Cl.[7] ........................................................ H04N 5/76
[52] U.S. Cl. ........................................... 348/231; 348/233
[58] Field of Search ....................... 358/213.26, 213.25, 358/409; 364/413.19; 382/56; 348/584, 588, 564, 565, 230, 231, 233, 232; 395/100, 116, 166

[56] References Cited

U.S. PATENT DOCUMENTS

| | | | |
|---|---|---|---|
| 4,680,643 | 7/1987 | Horiguchi | 358/409 |
| 4,799,108 | 1/1989 | Geener | 358/213.26 |
| 4,825,301 | 4/1989 | Pape et al. | 358/213.26 |
| 5,153,730 | 10/1992 | Nagasaki et al. | 348/231 |
| 5,157,433 | 10/1992 | Onozuka et al. | 396/90 |

FOREIGN PATENT DOCUMENTS 3-139078  6/1991  Japan ............................... H04N 5/92

*Primary Examiner*—Wendy Garber
*Assistant Examiner*—Andrew B. Christensen

[57] ABSTRACT

A digital electronic still-video camera is capable of performing rapid-sequence photography at high speeds. When a rapid-sequence photographic mode has been set, each of a plurality of frames of image data obtained by such photography is compressed. Image data which forms a single multiple-frame picture is constructed by a set of image data composed of the compressed plurality of frames. Thinning out is performed in order to compress the image data. The image data is successively stored, while being thinned out, at corresponding addresses of an image memory in such a manner that a multiple-frame picture is constructed in the image memory. After photography in the rapid-sequence mode ends, the image data in the image memory is subjected to data compression and then recorded on a memory card.

10 Claims, 5 Drawing Sheets

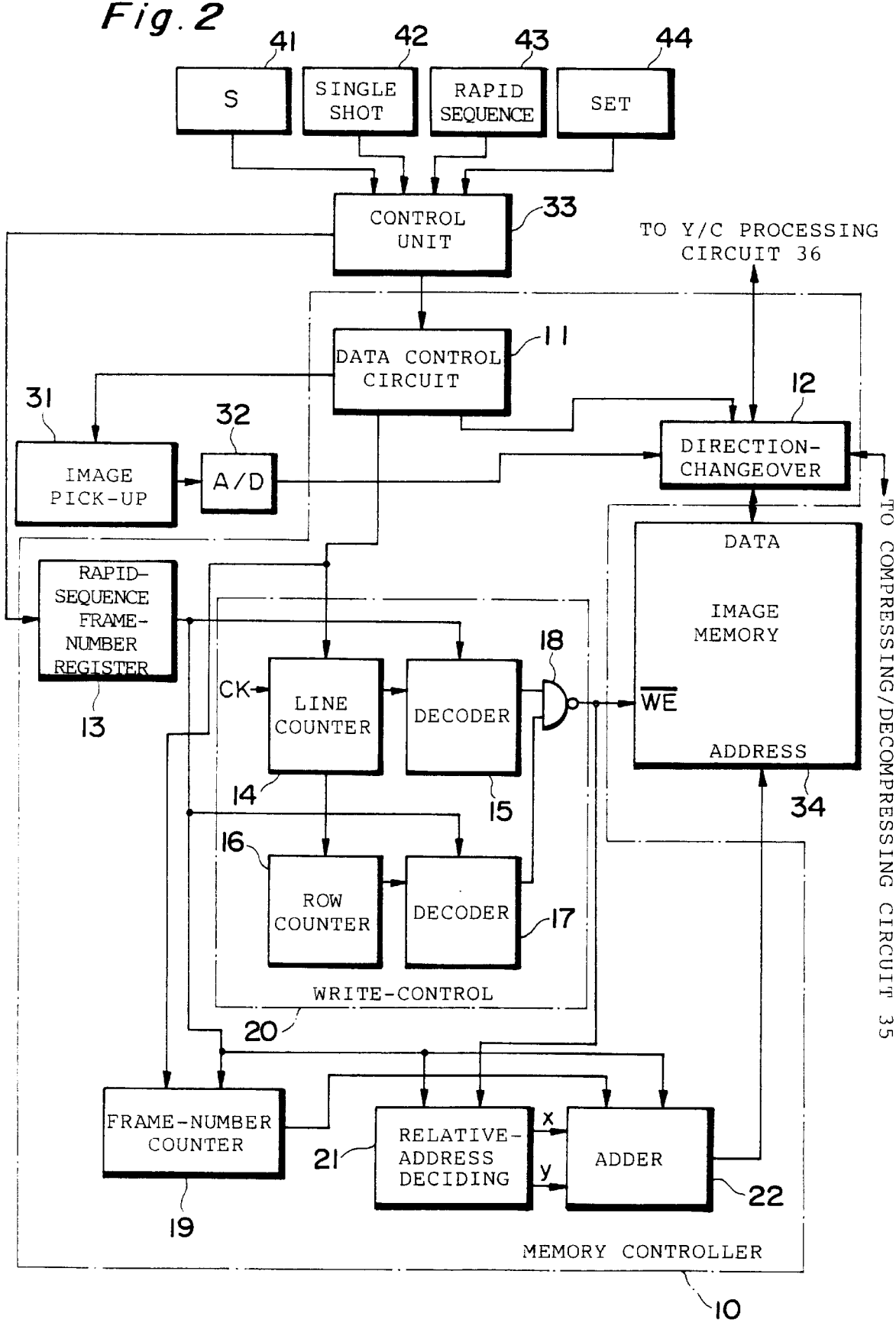

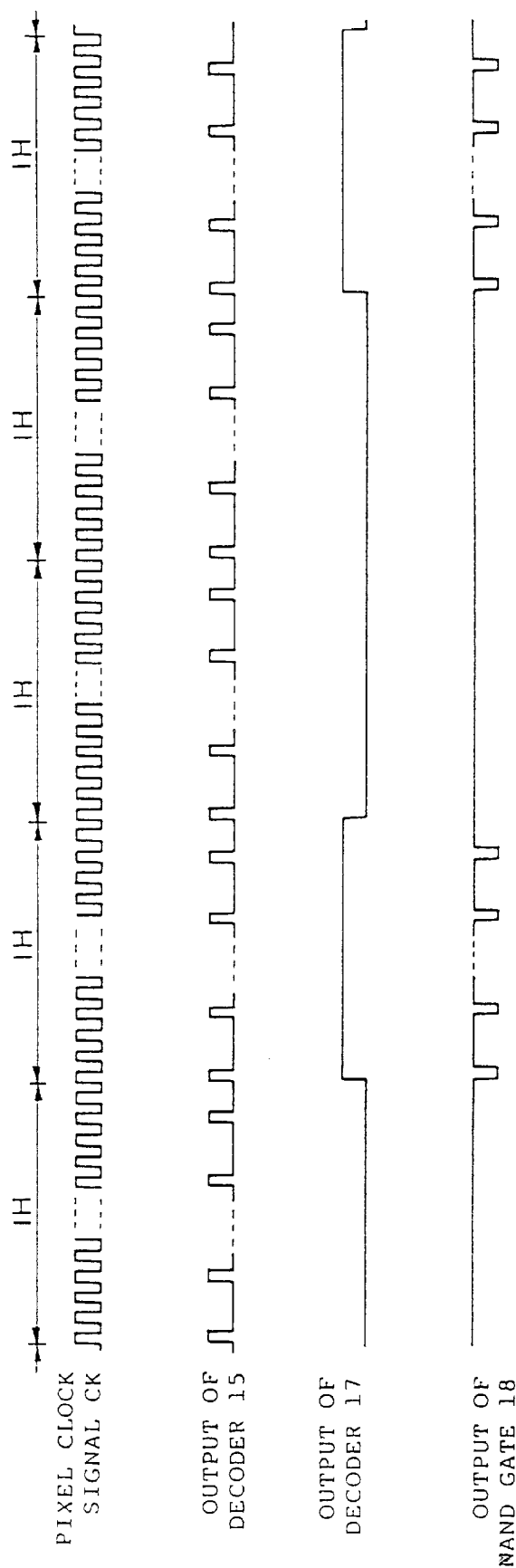

```
┌─────────┬─────────┬─────────┐
│         │ OFFSET  │         │
│         │ ADDRESS │         │
│         │  (X,Y)  │         │
│         ╳─────────┼─────────┤
│         │    ×    │         │
│         │ ABSOLUTE│         │
│         │ ADDRESS │         │
│         │ (x+X,y+Y)│        │
├─────────┼─────────┼─────────┤
│         │         │         │
│         │         │         │
└─────────┴─────────┴─────────┘
```

DIGITAL ELECTRONIC STILL-VIDEO CAMERA, AND METHOD OF CONTROLLING SAME

BACKGROUND OF THE INVENTION

1. Field of the Invention

This invention relates to a digital electronic still-video camera as well as to a method of controlling the camera.

2. Description of the Related Art

In a digital electronic still-video camera, data compression is carried out in order to record image data, which represents the image of a subject, on a memory card in an efficient manner. The compressed data is decompressed in order that the image of the subject represented by the compressed image data may be displayed on a monitor display unit.

A digital electronic still-video camera can be set to take a sequence of pictures in addition to a single picture in the same manner as a conventional camera which records the image of a subject on silver halide film, thereby making rapid-sequence photography possible. In a digital electronic still-video camera, however, time is needed for data compression owing to the necessity for compression of the image data. As a result, the limit on rapid-sequence picture taking is on the order of three pictures in one second.

SUMMARY OF THE INVENTION

Accordingly, an object of the present invention is to provide a digital electronic still-video camera, as well as a method of controlling the same, in which rapid-sequence photography is possible at high speed.

According to the present invention, the foregoing object is attained by providing a digital electronic still-video camera comprising image pick-up means for outputting image data, which represents the image of a subject, each time a picture is taken in a rapid-sequence photographic operation, an image memory for storing one frame of image data, first compressing means for compressing the one frame of image data, which is outputted by the image pick-up means, in such a manner that the amount of image data will become the reciprocal of a predetermined maximum number of frames capable of being photographed in rapid sequence, means for performing control in such a manner that the image data compressed by the first compressing means will be stored in an area of the image memory that conforms to the number of picture-taking operations in the rapid-sequence photographic operation, the image memory being segmented into a plurality of areas in accordance with the maximum number of frames capable of being photographed in rapid sequence, second compressing means for compressing the image data, which has been stored in the image memory, after the rapid-sequence photographic operation ends, and means for recording, on a recording medium, the image data compressed by the second compressing means.

Further, in accordance with the present invention, the foregoing object is attained by providing a method of controlling a digital electronic still-video camera, comprising a step of performing a first data compression, with regard to one frame of image data which represents the image of a subject obtained in each picture-taking operation of a rapid-sequence photographic operation, in such a manner that the amount of data will become the reciprocal of a predetermined maximum number of frames capable of being photographed in rapid sequence, a step of storing the image data, which has been compressed by the first data compression, in an area of the image memory that conforms to the number of picture-taking operations in the rapid-sequence photographic operation, the image memory being segmented into a plurality of areas in accordance with the maximum number of frames capable of being photographed in rapid sequence, a step of performing a second data compression with regard to the image data, which has been stored in the image memory, after the rapid-sequence photographic operation ends, and recording, on a recording medium, the image data compressed by the second compression.

The maximum number of frames capable of being photographed in rapid sequence may be decided permanently in advance or the maximum number of frames can be set at will from an input unit.

The end of the rapid-sequence photographic operation may be when the predetermined number of frames have been taken or when depression of a shutter-release button is released during the picture-taking operation.

The first compression may be performed by extracting (by means of thinning-out processing) one pixel of image data from image data of pixels, the number of which is the maximum number of frames capable of being photographed in rapid sequence, or by creating one pixel of image data by averaging image data composed of pixels, the number of which is the maximum number of frames capable of being photographed in rapid sequence.

Thus, in accordance with the present invention, a first compression is performed in such a manner that the one frame of image data outputted by the image pick-up means will become an amount of data which is the reciprocal of a predetermined maximum number of frames capable of being photographed in rapid sequence. The compressed image data is stored temporarily in an area of the image memory that conforms to the number of picture-taking operations in the rapid-sequence photographic operation, the image memory being segmented into a plurality of areas. All of the image data thus temporarily stored is subjected to a second compression and then recorded on the recording medium.

In accordance with the invention, the arrangement is such that prior to the compression of image data and recording of the compressed image data on the recording medium, data compression is performed once, one picture is constructed by image data composed of a plurality of frames, the constructed picture is stored temporarily in the image memory, the image data that has been stored in the image memory is compressed and the compressed image data is then recorded on the recording medium. As a result, data compression processing for image data of a plurality of frames need be performed only one time. This makes possible rapid-sequence photography at high speeds.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a block diagram illustrating an example of the construction of a memory controller for an embodiment of the present invention;

FIG. 3 is a time chart representing the output timing of various circuits contained in the memory controller for an embodiment of the present invention;

DESCRIPTION OF THE PREFERRED EMBODIMENT

Figure 1:
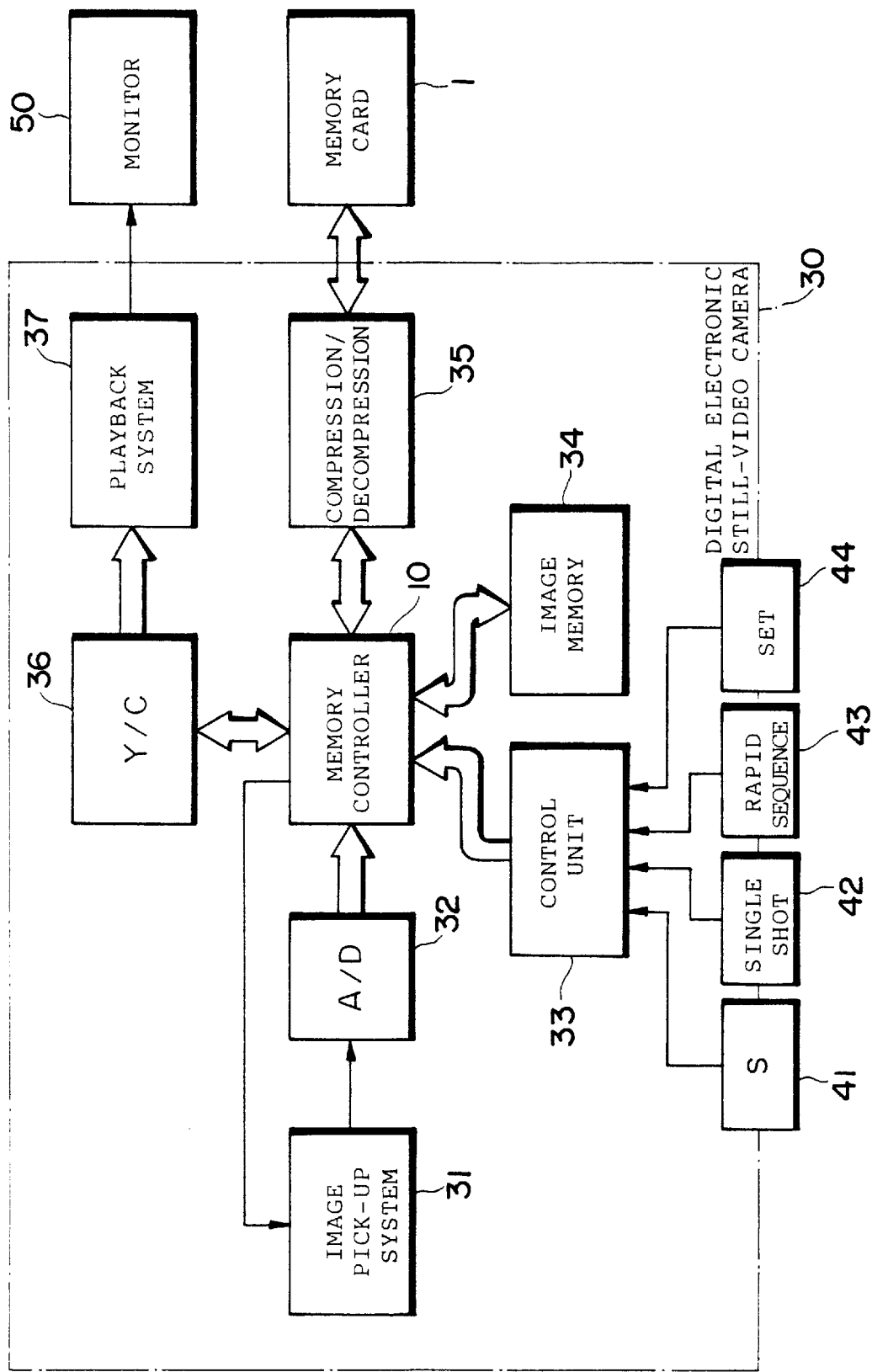
FIG. 1 is a block diagram illustrating the overall configuration of a digital electronic still-video camera for an embodiment of the present invention.

FIG. 1 is a block diagram illustrating the overall electrical configuration of a digital electronic still-video camera embodying the present invention.

In addition to a digital electronic still-video camera 30 shown in FIG. 1, there are illustrated a memory card 1 for storing image data representing the image of a subject photographed by the electronic still-video camera 30, and a monitor display unit 50 for visibly displaying the image of the subject. The memory card 1 and monitor display unit 50 are capable of being connected to the electronic still-video camera 30 in a detachable manner.

The overall operation of the digital electronic still-video camera 30 is supervised by a control unit 33.

The digital electronic still-video camera 30 includes a shutter-release button 41 which, when pressed, applies a signal indicative thereof to the control unit 33. The digital electronic still-video camera 30 is capable of photographing a subject in a rapid-sequence photographic mode as well as in a single-shot mode. To this end, there are provided a single-shot mode setting switch 42, a rapid-sequence photographic mode setting switch 43 and a rapid-sequence frame-number setting switch 44. Signals representing the settings of these switches 42~44 are applied to the control unit 33.

When the rapid-sequence photographic mode has been set by the rapid-sequence photographic mode setting switch 43 in the digital electronic still-video camera 30 shown in FIG. 1, a single multiple-frame picture is constructed based upon data image of a set number of rapid-sequence frames, in a manner described later, under the control of the memory controller 10, and image data representing the multiple-frame picture is stored temporarily in an image memory 34.

An example of the construction of the memory controller 10 is illustrated in FIG. 2. The memory controller 10 includes a data control circuit 11 for controlling the flow of image data, a direction-changeover control circuit 12 for controlling the direction in which image data is transmitted, a register 13 for temporarily storing the number of rapid-sequence frames set by the rapid-sequence frame-number setting switch 44, a frame-number counter 19 for counting the number of rapid-sequence picture-taking operations presently being performed, a write-control circuit 20 for controlling the writing of the image data in the image memory 34, and a relative-address deciding circuit 21 and adder 22, which are for designating the address of image data stored in the image memory 34.

With reference again to FIG. 1, the digital electronic still-video camera 30 includes, in addition to the memory controller 10, an image pick-up system 31 for outputting an analog video signal representing the image of a subject, an A/D converter 32 for converting the analog video signal into a digital image signal, a compressing/decompressing (expanding) circuit 35 for compressing the image data and decompressing the compressed image data, a Y/C processing circuit 36 for generating luminance data and chrominance data, and a playback system 37 which executes playback processing for displaying an image on the monitor display unit 50.

Figures 4A, 4B:
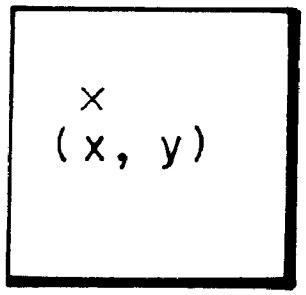
FIG. 4a is a diagram schematically representing multiple frames formed in a memory.
FIG. 4b is a diagram schematically representing a small frame constituting the multiple frames for embodiments of the present invention.
Figure 5:
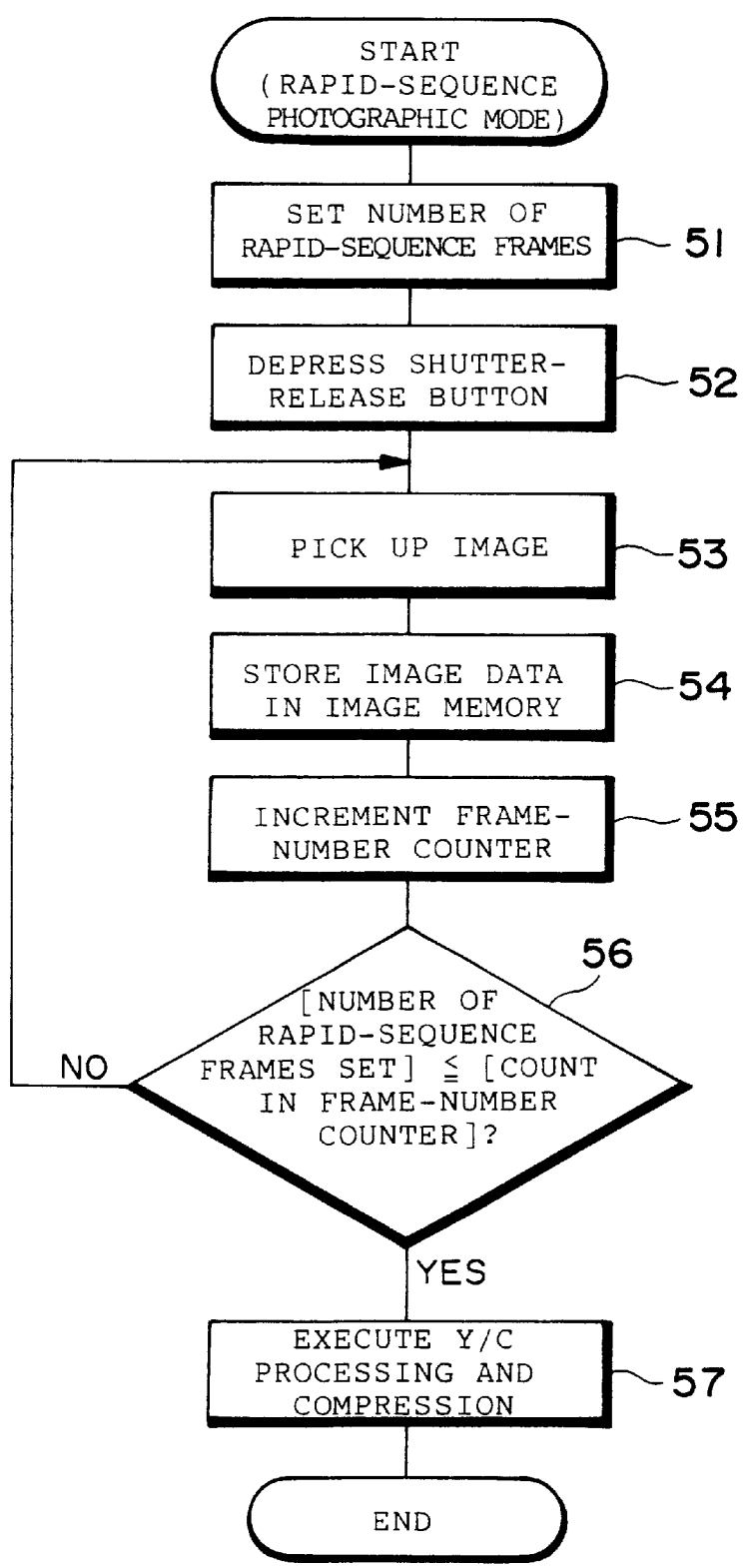
FIG. 5 is a flowchart illustrating a processing procedure for a case where a rapid-sequence photographic mode has been set for an embodiment of the present invention.

FIG. 3 is a time chart illustrating the timing of data output from each circuit contained in the memory controller 10. FIG. 4a schematically illustrates a multiple-frame picture formed in the image memory 34, and FIG. 4b illustrates a small frame constituting the multiple-frame picture shown in FIG. 4a. FIG. 5 is a flowchart illustrating the procedure of processing for recording image data on the memory card 1 when the rapid-sequence photographic mode has been set in the digital electronic still-video camera 30 shown in FIG. 1.

The rapid-sequence photographic mode is set by the photographer using the rapid-sequence photographic mode setting switch 43, and the number of rapid-sequence frames to be shot is set by the photographer using the rapid-sequence frame-number setting switch 44 (step 51). The set number of rapid-sequence frames is stored temporarily in the rapid-sequence frame-number register 13. The amount (number of pixels) of image data constituting the small frame is decided by the set number of rapid-sequence frames.

When the shutter-release button 41 is pressed by the photographer (step 52), a control signal is supplied to the image pick-up system 31 from the data control circuit 11, which is contained in the memory controller 10, under the control of the control unit 33. Since the image pick-up system 31 includes an image pick-up lens and a CCD, an analog video signal representing the image of the subject photographed is outputted in response to the control signal from the data control circuit 11 (step 53). The analog video signal is applied to the A/D converter 32, where the analog video signal is converted into a digital image data that is then applied to the direction-changeover control circuit 12 of the memory controller 10.

With reference to FIG. 2, a timing signal from the data control circuit 11 is applied to the direction-changeover control circuit 12, image data is outputted from the direction-changeover control circuit 12 in dependence upon the timing signal, and this image data is applied to the image memory 34.

The write-control circuit 20 includes a line counter 14, a row counter 16, decoders 15, 17 and a NAND gate 18. A pixel-clock signal is applied to the line counter 14, whereby the pixel-clock signal is counted. As a result, the line counter 14 outputs a count signal which represents the pixel position along the horizontal direction in one frame. When the pixel-clock signal equivalent to one horizontal scanning interval (1H) is counted by the line counter 14, this line counter 14 applies a signal indicative of 1H to the row counter 16. The latter outputs a count signal which represents a position along the vertical direction in one frame. The decoder 15 produces a signal which controls the writing of one frame of image data in the horizontal direction, and the decoder 17 produces a signal which controls the writing of one frame of image data in the vertical direction.

The number of rapid-sequence frames stored temporarily in the rapid-sequence frame-number register 13 is applied to the decoders 15 and 17. On the basis of output signals from the decoders 15 and 17, thinning out of pixel data corresponding to the number of rapid-sequence frames stored in the register 13 is carried out. For example, if the number of rapid-sequence frames is nine, then the decoder 15 outputs a signal in such a manner that item one image data is extracted with respect to three items of image data in the horizontal direction, and the decoder 17 outputs a signal in such a manner that one item of image data is extracted with respect to three items of image data in the vertical direction, so that one picture will be constructed from nine frames of image data, as illustrated in FIG. 3.

The output signals from the decoders 15 and 17 are applied to the NAND gate 18. When both decoders 15 and 17 output signals, the NAND gate 18 produces an output signal, which is applied to a write-enable terminal WE of the image memory 34.

The number of rapid-sequence frames stored in the rapid-sequence frame-number register 13 is applied to the frame-number counter 19, the offset circuit or relative-address deciding circuit 21 and the adder 22. The frame-number counter 19 counts frames to determine what the frame number is of the analog video signal outputted by the image pick-up system 31, this frame number being one among the number of rapid-sequence frames. By counting the number of signals outputted by the data control circuit 11 (one signal is outputted whenever a single picture is taken), the frame-number counter 19 is capable of counting the number of rapid-sequence shots (namely what the number of the shot is in the rapid sequence). The counted number of rapid-sequence shots is applied to the adder 22.

The total number of items of image data (the total number of pixels) which constructs the small frame is calculated by the relative-address deciding circuit 21 based upon the set number of rapid-sequence frames. The output signal of the NAND gate 18 which enters the write-enable terminals of the image memory 34 is applied to the relative-address deciding circuit 21. On the basis of these inputs to the relative-address deciding circuit 21, the latter decides an address (relative address) (x,y) in the small frame, as shown in FIG. 4b. The relative address (x,y) decided is applied to the adder 22.

In order to decide the absolute address in the multiple frames, as shown in FIG. 4a, the adder 22 creates an offset address (X,Y) (the offset address is a memory address of a reference position of the small frame, e.g., the position of the upper left corner thereof) from the present number of frames shot (namely what the number of the present shot is, which is the same as the number of times rapid-sequence shots have been taken), which is provided by the frame-number counter 19, and the set number of rapid-sequence frames, which is provided by the rapid-sequence frame-number counter 13. The relative address (x,y) is added to the offset address (X,Y) to calculate the absolute address (X+x,Y+y). The absolute address (X+x,Y+y) created is applied to an address-input terminal of the image memory 34.

When an L-level output signal from the NAND gate 18 is thus applied to the write-enable terminal of the image memory 34, image data applied to the data input terminal of the image memory 34 is stored at the position of the absolute address provided by the adder 22 (step 54).

When one small frame of the image data is stored in the image memory 34, the frame-number counter 19 is incremented (step 55).

The processing of steps 53~55 continues until the set number of rapid-sequence frames and the counted value in the frame-number counter 19 become equal (step 56).

When the set number of rapid-sequence frames and the counted value in the frame-number counter 19 become equal (YES at step 56), one multiple-frame picture is constructed in memory by the image data of the set number of rapid-sequence frames. This multiple-frame picture is stored in the image memory 34.

The image data stored temporarily in the image memory 34 is applied first to the Y/C processing circuit 36 under the direction control of the direction-changeover control circuit 12. The Y/C processing circuit 36 produces luminance data and chrominance data. The Y/C data is stored temporarily in the image memory 34. Thereafter, the data is read out of the image memory 34 again and subjected to data compression by the compressing/decompressing circuit 35 (step 57). The image data that has been compressed is supplied to and recorded on the memory card 1.

The image data that has been stored in the image memory 34 is image data composed of a plurality of frames. However, since these items of image data have been stored in the image memory 34 upon being thinned out in advance, the data compression can be performed by the compressing/decompressing circuit 35 in a period of time shorter than the time for data compression required for compression of the image data of the normal plural number of frames not subjected to thinning. Accordingly, rapid-sequence photography is possible at high speeds.

The digital electronic still-video camera 30 shown in FIG. 1 is capable of reading out the image data that has been stored on the means card 1 and of visibly displaying the image represented by the image data on the monitor display unit 50.

The compressed image data that has been stored on the memory card 1 is read out and applied to the compressing/decompressing circuit 35, where the data is decompressed. The decompressed image data is temporarily stored in the image memory 34. The image data is read out of the image memory 34 and applied to the playback system 37 via the Y/C processing circuit 36.

The image data that has been applied to the playback system 37 is subjected to playback processing, which includes processing for converting the data into an analog video signal. The analog video signal outputted by the playback system 37 is applied to the monitor display unit 50, where the video signal is displayed as an image.

When the single-shot photographic mode has been set by the single-shot mode setting switch 42, all of the image data of one frame is stored in the image memory 34, without application of the thinning-out processing in the memory controller 10, and the stored data is subjected to data compression, in the manner set forth above.

In the embodiment described above, the camera is provided with the rapid-sequence frame-number setting switch 44 and rapid-sequence photography corresponding to the set number of rapid-sequence frames is performed. However, it is permissible to adopt an arrangement in which, rather than providing the rapid-sequence frame-number setting switch, the number of rapid-sequence frames is fixed and shots are taken in rapid sequence in the fixed number of frames.

Further, in the foregoing embodiment, the image data is stored on the memory card 1 when photography in the number of frames set by the rapid-sequence frame-number setting switch 44 is completed. However, an arrangement can be adopted in which recording of the image data is linked to depression of the shutter15 release button 41 and the image data is recorded on the memory card 1 when the shutter-release button 41 is no longer being depressed.

As many apparently widely different embodiments of the present invention can be made without departing from the spirit and scope thereof, it is to be understood that the invention is not limited to the specific embodiments thereof except as defined in the appended claims.

What is claimed is:

1. A digital electronic still-video camera having a rapid sequence photographic mode in which image data representing a plurality of successively picked-up frames is reduced for storage in a plurality of areas in an image memory, comprising:

an image pick-up device for outputting image data, which represents the image of a subject, each time a picture is taken in the rapid-sequence photographic mode;

said image memory for storing one frame of image data;

a frame-number storage device for storing a rapid-sequence frame-number;

a data reducing device for reducing the amount of one frame of image data which is output by said image pick-up device, at a reduction rate determined in accordance with the rapid-sequence frame-number stored in said frame-number storage device, and for outputting the reduced image data;

a frame-number counting device for counting a number of frames successively picked-up in rapid-sequence, and storing the counted number;

a relative address generating device for generating and outputting a relative address of an area of said image memory; and an absolute address generating device for determining an offset address based upon the rapid-sequence frame-number stored in said frame-number storage device and the counted number stored in said frame-number counting device, and for generating and outputting an absolute address using the determined offset address and the relative address output from said relative-address generating device, the absolute address designating a location in said image memory where the reduced image data output from said data reducing device is stored, whereby reduced image data is stored in the plurality of areas of said image memory in such an arrangement that a multiple-frame picture is formed in said image memory.

2. The camera according to claim 1, further comprising a mode setting switch for selecting one of a rapid-sequence photographic mode and a single shot mode.

3. The camera according to claim 1, further comprising a user-operable input device for entering a rapid-sequence frame-number, the entered number being stored in said frame-number storage device.

4. The camera according to claim 1, wherein said data reducing device includes a thinning-out device for extracting image data of a single pixel from image data of a plurality of pixels.

5. The camera according to claim 1, wherein said data reducing device includes an averaging device for creating image data of a single pixel by averaging image data of a plurality of pixels.

6. A method of controlling a digital electronic still-video camera having a rapid sequence photographic mode in which image data representing a plurality of successively picked-up frames, is reduced for storage in a plurality of areas in an image memory, the method comprising:

outputting image data, which represents the image of a subject, each time a picture is taken in the rapid-sequence photographic mode;

storing a frame of image data in the image memory;

storing a rapid-sequence frame-number;

reducing the amount of the output image data at a reduction rate determined in accordance with the stored rapid-sequence frame-number and outputting the reduced imaged data;

counting a number of frames successively picked-up in rapid-sequence and storing the counted number;

generating and outputting a relative address of an area of the image memory;

determining an offset address based upon the stored rapid-sequence frame-number and the stored counted number; and generating and outputting an absolute address using the determined offset address and the relative address, the absolute address designating a location in the image memory where the reduced image data is stored, whereby reduced image data is stored in the plurality of areas of the image memory in such an arrangement that a multiple-frame picture is formed in the image memory.

7. The method according to claim 6, further comprising selecting one of a rapid-sequence photographic mode and a single shot mode.

8. The method according to claim 6, further comprising entering and storing a rapid-sequence frame-number.

9. The method according to claim 6, wherein said reducing step includes extracting image data of a single pixel from image data of a plurality of pixels.

10. The method according to claim 6, wherein said reducing step includes creating image data of a single pixel by averaging image data of a plurality of pixels.

* * * * *